(12) United States Patent
Norton et al.

(10) Patent No.: US 9,117,028 B2
(45) Date of Patent: Aug. 25, 2015

(54) AUTOMATED FRAMEWORK FOR DYNAMICALLY CREATING TEST SCRIPTS FOR SOFTWARE TESTING

(75) Inventors: Anthony Norton, Normandy Park, WA (US); Hung T. Van, Renton, WA (US); Scott K. Sipe, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 802 days.

(21) Appl. No.: 13/326,818

(22) Filed: Dec. 15, 2011

(65) Prior Publication Data

US 2013/0159974 A1     Jun. 20, 2013

(51) Int. Cl.
*G06F 9/44*     (2006.01)
*G06F 11/36*    (2006.01)

(52) U.S. Cl.
CPC .................................. *G06F 11/3684* (2013.01)

(58) Field of Classification Search
None
See application file for complete search history.

(56) References Cited

U.S. PATENT DOCUMENTS

| | | | |
|---|---|---|---|
| 6,002,869 A * | 12/1999 | Hinckley | 717/124 |
| 7,975,296 B2 * | 7/2011 | Apfelbaum et al. | 726/22 |
| 2003/0159063 A1 * | 8/2003 | Apfelbaum et al. | 713/200 |
| 2005/0229161 A1 * | 10/2005 | Wang et al. | 717/125 |
| 2005/0234708 A1 * | 10/2005 | Meehan et al. | 704/9 |
| 2006/0101397 A1 * | 5/2006 | Mercer et al. | 717/120 |
| 2006/0179386 A1 * | 8/2006 | Pushpavanam et al. | 714/742 |
| 2008/0244524 A1 * | 10/2008 | Kelso | 717/124 |
| 2009/0006897 A1 * | 1/2009 | Sarsfield | 714/38 |
| 2009/0249297 A1 * | 10/2009 | Doshi et al. | 717/124 |
| 2010/0218168 A1 * | 8/2010 | Gonzales, II | 717/124 |
| 2011/0145643 A1 * | 6/2011 | Kumar et al. | 714/33 |
| 2013/0159974 A1 * | 6/2013 | Norton et al. | 717/124 |
| 2014/0237295 A1 * | 8/2014 | Bokhari et al. | 714/38.1 |

OTHER PUBLICATIONS

European Search Report, European Application No. 12192274.4 (Feb. 6, 2013).

* cited by examiner

*Primary Examiner* — Don Wong
*Assistant Examiner* — Hossain Morshed
(74) *Attorney, Agent, or Firm* — Steven Corey

(57) ABSTRACT

A computer program product and method for dynamically creating test scripts for software testing. The method includes selecting one or more reference scripts to create a selected script set, selecting one or more parameters to create a selected parameter set, generating permutations of the selected script set based upon the selected script set and the selected parameter set, and generating permutation test scripts for each of the generated permutations which include test code, a dynamic variable, and varying values for the dynamic variable amongst the permutation test scripts. Depending upon the scope of the parameters, the generation of permutations uses variations of an n-ary Cartesian product to determine the permutations and varying content of the generated permutation test scripts.

19 Claims, 21 Drawing Sheets

Fig. 9A

```
On Error Resume Next
'xxxxxxxxxxxxxxxxxxxxxxxxxxxxxxxxxxxxxxxxxxxxxxxxxxxxxxxxxxxxxxxxxxxxxxxxxxxx
    'Dynamic Variables
    Dim SearchEngineUrl  ─────────────── 902
    Dim searchMessage
    Dim searchButtonName
    Dim searchTextBoxName
    Dim deleteCookies    ─────────────── 904
'xxxxxxxxxxxxxxxxxxxxxxxxxxxxxxxxxxxxxxxxxxxxxxxxxxxxxxxxxxxxxxxxxxxxxxxxxxxx
'xxxxxxxxxxxxxxxxxxxxxxxxxxxxxxxxxxxxxxxxxxxxxxxxxxxxxxxxxxxxxxxxxxxxxxxxxxxx
    'Local Script Variables
    Dim statusMessage
    Dim textValue
    Dim nameValue
    Dim valueValue
    Dim htmlidValue
    Dim innerhtmlValue
    Dim innertextValue
    Dim indexValue
    Dim outerhtmlValue
    Dim typeValue
    Dim NumberOfEdits
    Dim EditCollection
    Dim objectDescription
    Set objectDescription = Description.Create()
'xxxxxxxxxxxxxxxxxxxxxxxxxxxxxxxxxxxxxxxxxxxxxxxxxxxxxxxxxxxxxxxxxxxxxxxxxxxx
    statusMessage = "Start of SearchEngine test"
    Reporter.ReportEvent micPass, "Start Test", statusMessage
    WScript.timeout = 1

'log the SearchEngine url value
    statusMessage = "URL: " & SearchEngineUrl & " ;Search Message: " & searchMessage & " ;Search Button Name: " & searchButtonName
    Reporter.ReportEvent micPass, "Logging Status Message", statusMessage 'close all IE windows
    CloseAllInstancesOfIE 'open IE and browse to SearchEngine url
    SystemUtil.Run "C:\Program Files\Internet Explorer\iexplore.exe",SearchEngineUrl,"",open 'log message for browser open
    statusMessage = "Opened browser to SearchEngine url = " & SearchEngineUrl
    Reporter.ReportEvent micPass, "Logging Status Message", statusMessage objectDescription("micclass").Value = "WebEdit"

'type search message into the text box
    Browser("name:=.*").Page("name:=.*").WebEdit("name:=q").Set searchMessage
    Browser("name:=.*").Page("name:=.*").WebButton(searchButtonName).Click
    Browser("name:=.*").Sync
```

Fig. 9B

```
On Error Resume Next
'xxxxxxxxxxxxxxxxxxxxxxxxxxxxxxxxxxxxxxxxxxxxxxxxxxxxxxxxxxxxxxxxxxxxxxxxxxxxxxxx
    'Dynamic Variables
    Dim SearchEngineUrl = "http://www.search.tst.fr"  ─────── 902, 906
    Dim searchMessage = "pomme"
    Dim searchButtonName = "sb"
    Dim searchTextBoxName = "stb"
'xxxxxxxxxxxxxxxxxxxxxxxxxxxxxxxxxxxxxxxxxxxxxxxxxxxxxxxxxxxxxxxxxxxxxxxxxxxxxxxx
'xxxxxxxxxxxxxxxxxxxxxxxxxxxxxxxxxxxxxxxxxxxxxxxxxxxxxxxxxxxxxxxxxxxxxxxxxxxxxxxx
    'Local Script Variables
    Dim statusMessage
    Dim textValue
    Dim nameValue
    Dim valueValue
    Dim htmlidValue
    Dim innerhtmlValue
    Dim innertextValue
    Dim indexValue
    Dim outerhtmlValue
    Dim typeValue
    Dim NumberOfEdits
    Dim EditCollection
    Dim objectDescription
    Set objectDescription = Description.Create()
'xxxxxxxxxxxxxxxxxxxxxxxxxxxxxxxxxxxxxxxxxxxxxxxxxxxxxxxxxxxxxxxxxxxxxxxxxxxxxxxx
    statusMessage = "Start of SearchEngine test"
    Reporter.ReportEvent micPass, "Start Test", statusMessage
    WScript.timeout = 1

'log the SearchEngine url value
    statusMessage = "URL: " & SearchEngineUrl & " ;Search Message: " & searchMessage & " ;Search Button Name: " & searchButtonName
    Reporter.ReportEvent micPass, "Logging Status Message", statusMessage 'close all IE windows
    CloseAllInstancesOfIE 'clear cookies based on dynamic variable deleteCookies  ─────── 908
    webutil.DeleteCookies 'open IE and browse to SearchEngine url
    SystemUtil.Run "C:\Program Files\Internet Explorer\iexplore.exe",SearchEngineUrl,"",open 'log message for browser open
    statusMessage = "Opened browser to SearchEngine url = " & SearchEngineUrl
    Reporter.ReportEvent micPass, "Logging Status Message", statusMessage objectDescription("micclass").Value = "WebEdit"

'type search message into the text box
    Browser("name:=.*").Page("name:=.*").WebEdit(searchTextBoxName).Set searchMessage
    Browser("name:=.*").Page("name:=.*").WebButton(searchButtonName).Click
    Browser("name:=.*").Sync
```

AUTOMATED FRAMEWORK FOR DYNAMICALLY CREATING TEST SCRIPTS FOR SOFTWARE TESTING

FIELD

Embodiments of the subject matter described herein relate generally to a computer program product and method for dynamically creating test scripts for software testing.

BACKGROUND

Software testing, especially data-driven testing, has typically used structured test scripts containing loops or conditions which iterate through a data table in order to execute the desired tests. In order to change the scale of a test or to add new variables to a test script, the internal logic and structure of the test script needs to change to include additional loops and conditions for the new variables. Due to these changes in the test script, the test script itself needs to be regressed in order to maintain the validity of all existing iterations through the test script. This regression testing of the test script adds costs and time to the level of effort necessary to maintain and scale the test script.

Additionally, a user must have intimate knowledge of the test tool, as well as programming skills, in order to use and run the test script. A user must understand the structure of the test script once opened in the test tool, and then be able to work with and within the test script in order to run the test that is needed. These limitations add to the total cost of ownership and reduce the return on investment in developing and delivering a well tested, high quality software solution to the solution's intended users. Current software testing methods lack the automation to dynamically create test scripts with changing variables that can be used by both skilled and non-skilled software testers.

Advantages over the prior art are herewith provided in the following disclosure.

SUMMARY

Presented, in one aspect, is a computer program product comprising a storage medium having a computer readable program code embodied therein, the computer readable program code being adapted to execute a method for dynamically creating test scripts for software testing.

In the same or other aspects, the method for dynamically creating test scripts for software testing may include the steps of selecting one or more reference scripts to create a selected script set, selecting one or more parameters for use with the selected script set to create a selected parameter set, generating permutations of the selected script set based upon the selected script set and the selected parameter set, generating permutation test scripts for each of the generated permutations, with a plurality of the generated permutation test scripts including test code, a dynamic variable, and varying values for the dynamic variable amongst the plurality of the generated permutation test scripts, and executing at least one of the plurality of the generated permutation test scripts. The method may further include the steps of aggregating results of the executed permutation test scripts to create an aggregated result set, and displaying the aggregated result set to a user.

The features, functions, and advantages discussed can be achieved independently in various embodiments of the present invention, or may be combined in yet other embodiments further details of which can be seen with reference to the following description and drawings.

BRIEF DESCRIPTION OF THE DRAWINGS

The accompanying figures depict various embodiments of the automated framework for dynamically creating test scripts for software testing. A brief description of each figure is provided below. Elements with the same reference number in each figure indicate identical or functionally similar elements. Additionally, the left-most digit(s) of a reference number indicate the drawing in which the reference number first appears.

FIGS. 9A and 9B are exemplary screen shots of s reference script and a permutation test script, respectively.

FIG. 15 is a smaller scale view showing the whole formed by the partial views of FIGS. 15A-D.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, summary, or the following detailed description.

The automated framework for dynamically creating test scripts for software testing automates data driven, keyword driven, meta data driven, model based, and hybrid testing so that both skilled and non-skilled software testers can gain 90%+ confidence of quality in their hardware and software products. Advantages achieved from such testing automation include: reducing the number of test tools and scripts required to provide software testers with 90%+ confidence in their hardware or software products, reducing the time invested in ongoing maintenance of test tools, scripts, and the variable data that are used with them, reducing the time to scale testing and test tools to match business processes and feature sets that are continually added to a product offering, and allowing non-technical testers to test software without any prior knowledge or expertise while creating and running dynamically generated permutations of tests.

Figure 1:
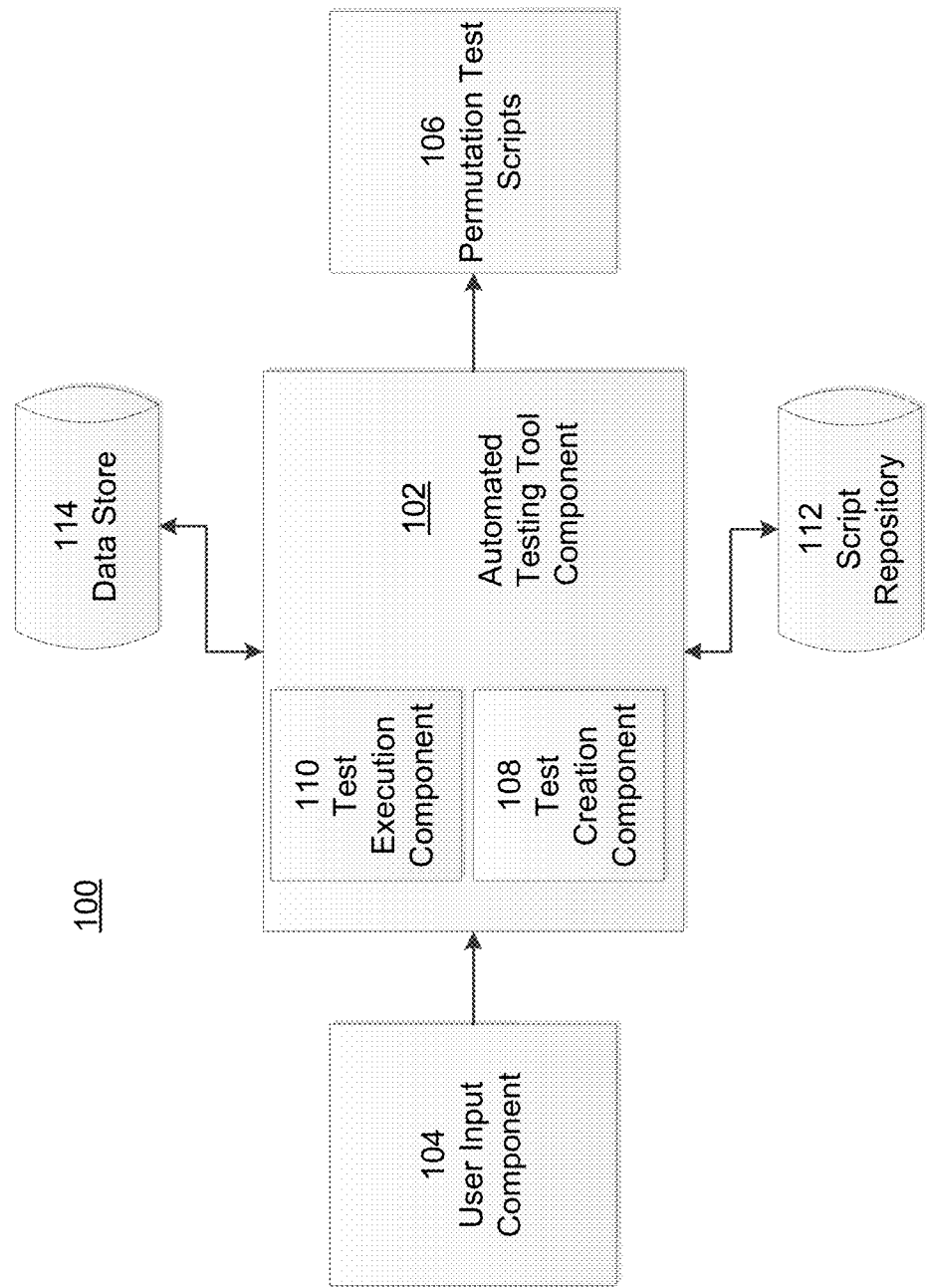
FIG. 1 is schematic illustration of the automated framework for dynamically creating test scripts for software testing.

Referring to FIG. 1, in an exemplary embodiment, the Automation Framework 100 may be comprised of an automated testing tool component 102, a user input component 104, a test creation component 108, a test execution component 110, a script repository 112, and a data store 114. As used herein, terms such as "component" and "system" refer to computer-related entities, such as hardware, firmware, software, or any combination thereof, including software in execution. For example, a component may be, but is not limited to, a process running on a processor, a processor, an object, an executable, a thread of execution, a program, and/or a computer. Both an application executing on computer and the computer can be a component. Additionally, as used herein, terms such as "data store" and "repository" refer to methods or devices for storing electronic data such as a relational database, an SQL database, a flat file, an indexed file, magnetic tape, flash memory, or any other method or device that would be known to a person of ordinary skill in the art for storing electronic data.

A software tester may use the user input component 104 to access the test creation component 108 in order to create reference scripts and to define parameterized dynamic variables, as well as rule sets governing the relationships between parameters and dynamic variable values and value types, for recombination in subsequent tests. Additionally, the software tester may use the user input component 104 to access the test execution component 110 in order to select one or more reference scripts to run and, for each reference script, a number of parameters, if any, which will vary the conditions to be tested. User input component 104 may be any component used to input data into a computer such as a graphical user interface (GUI), a keyboard, a data file, or any other component that would be known to a person of ordinary skill in the art for inputting data into a computer. After the reference scripts and parameters are selected, the automated testing tool component 102 generates every permutation of the selected reference scripts. For each permutation created, the automated testing tool component 102 dynamically generates permutation test scripts 106 including the needed testing code and dynamic variable values based upon the permutated parameters.

Figure 2:
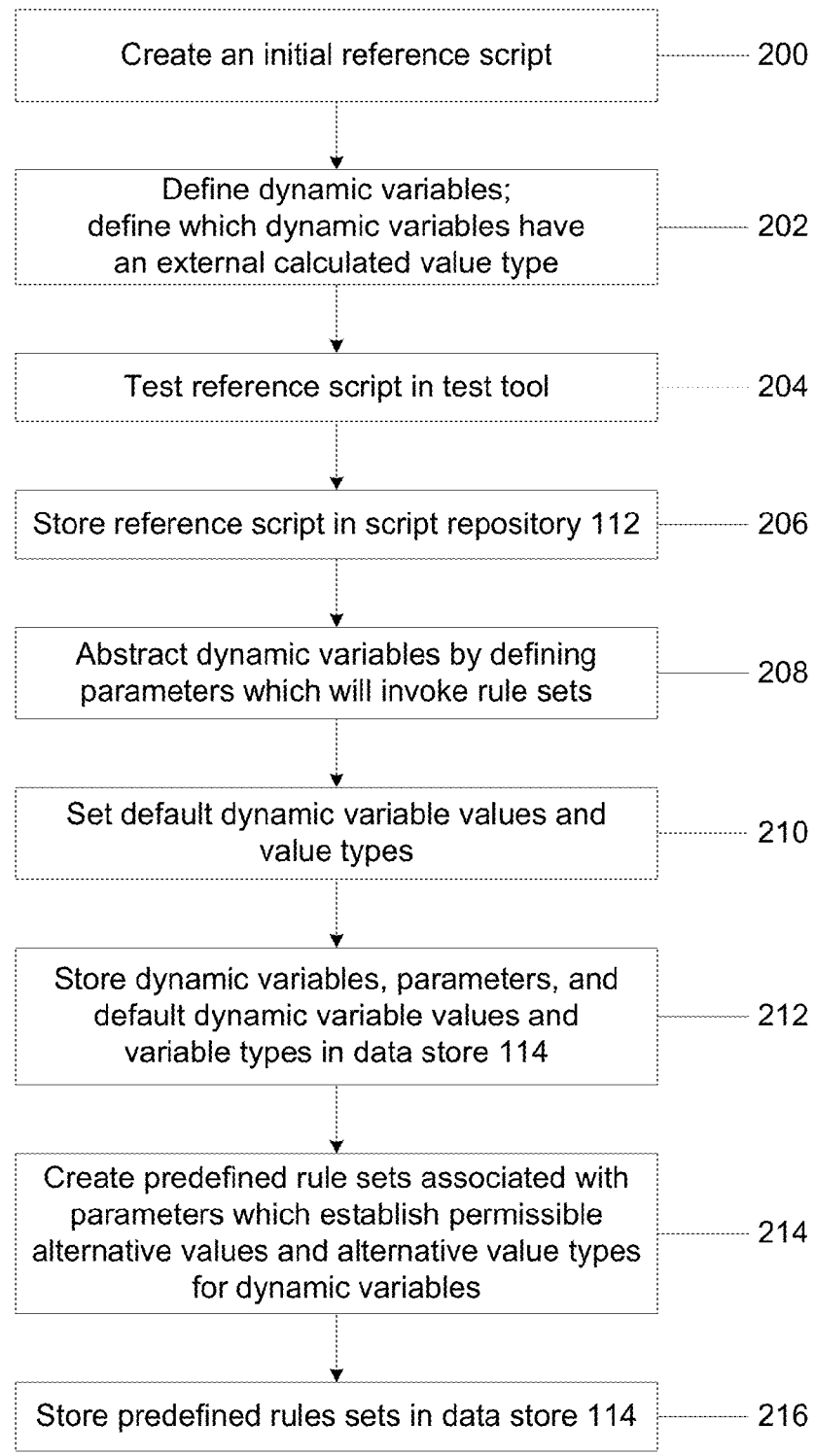
FIG. 2 is a flow chart illustrating a series of steps for creating reference scripts and parameterized dynamic variables which are used by the automated framework.

Referring to FIG. 2, in an embodiment, the software tester may access the test creation component 108 to create reference scripts, to define dynamic variables, and to parameterize the dynamic variables for future tests. At step 200, the software tester may create an initial reference script using a test tool such as Quick Test Professional, Sahi, Selenium, LoadRunner®, BadBoy, JMeter, SilkTest, or any other test tool that would be known to a person of ordinary skill in the art. At step 202, the software tester defines the dynamic variables needed for the test, and defines which dynamic variables will need to have data generated at run time (i.e., which dynamic variables will have an external calculated value type). At step 204, the software tester may test the reference script in the test tool in order to verify that any modifications made to introduce a dynamic variable into the reference script have not introduced errors. At step 206, the reference script is stored in the script repository 112. At step 208, the software tester abstracts the dynamic variables by defining parameters which will invoke rule sets governing the variable values and value types of one or more dynamic variables in the reference script. The software tester may go through an iterative process to refactor the reference script, its dynamic variables, and the parameterization until reaching a point of diminished returns. At step 210, the software tester sets the default dynamic variable values and value types. At step 212, the dynamic variables, the parameters, and the default dynamic variable values and variable types are stored in the data store 114. At step 214, the software tester creates predefined rule sets associated with the parameters which establish permissible alternative values and alternative value types for the dynamic variables. At step 216, the predefined rule sets are stored in the data store 114. The definition of parameters is three fold: 1) a simplistic associative unit (key value pairing) used by the software tester to invoke a predefined rule set, 2) a selection used to create a tuple or tuples which, in turn, are used in logic to generate permutations of the test script, and 3) a selection used to create tuples which, in turn, are used in relational division logic to derive the affected dynamic variables and their alternative values and/or value types in permutations of the reference script.

Figure 3:
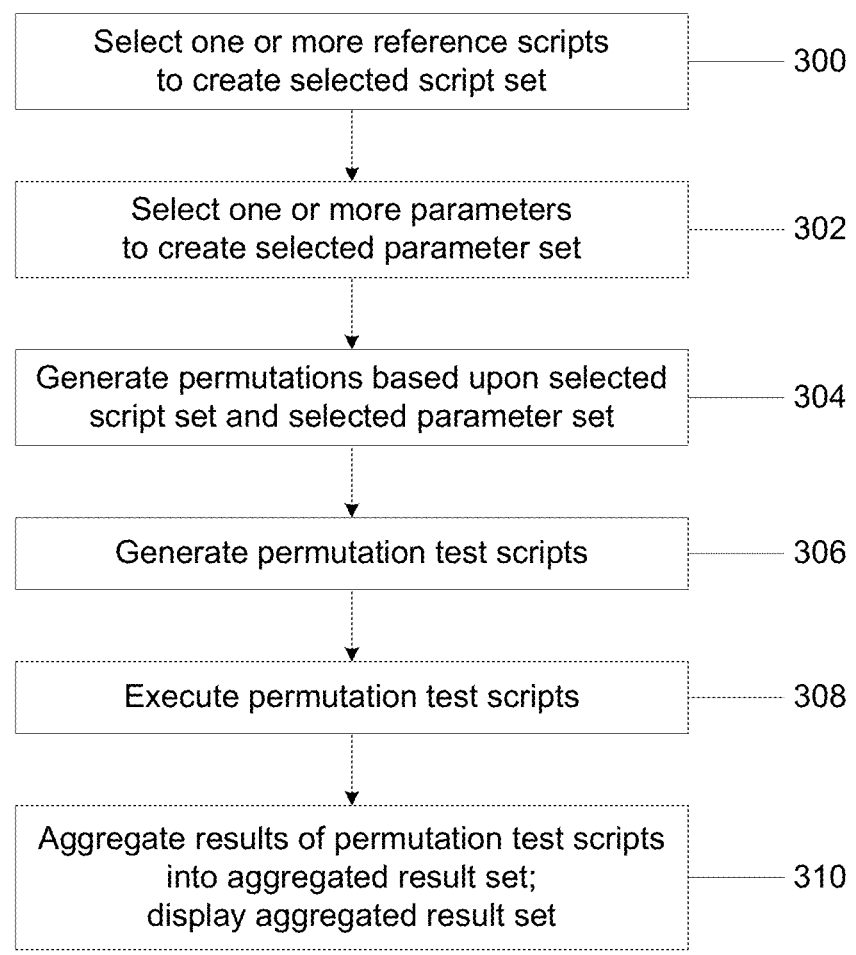
FIG. 3 is a flow chart of an exemplary operation of the automated framework.

Referring to FIG. 3, in an embodiment, another software tester may access the test execution component 110 to run selected reference scripts. At step 300, the software tester may select one or more reference script(s) from the script repository 112 to create a selected script set for execution in a test. At step 302, the software tester may select parameters from the data store 114 for use with the selected script set to create a selected parameter set identifying the conditions to vary in the test. At step 304, the automated testing tool component 102 generates permutations based upon the software tester's selections. At step 306, the automated testing tool component 102 generates permutation test scripts 106 including in-common test code and the dynamic variable(s) and varying variable values for each permutation based upon the software tester's selections and, more specifically, permutations of the selected script set, the selected parameter set, and the predefined rule sets invoked by the selected parameter set. At step 308, the automated testing tool component 102, a software agent, or possibly the software tester themself, executes the permutation test scripts to conduct the test. At step 310, the automated testing tool component 102 may aggregate the results of the permutation test scripts into a single aggregated result set, and display the aggregated result set to the software tester.

Figure 4:
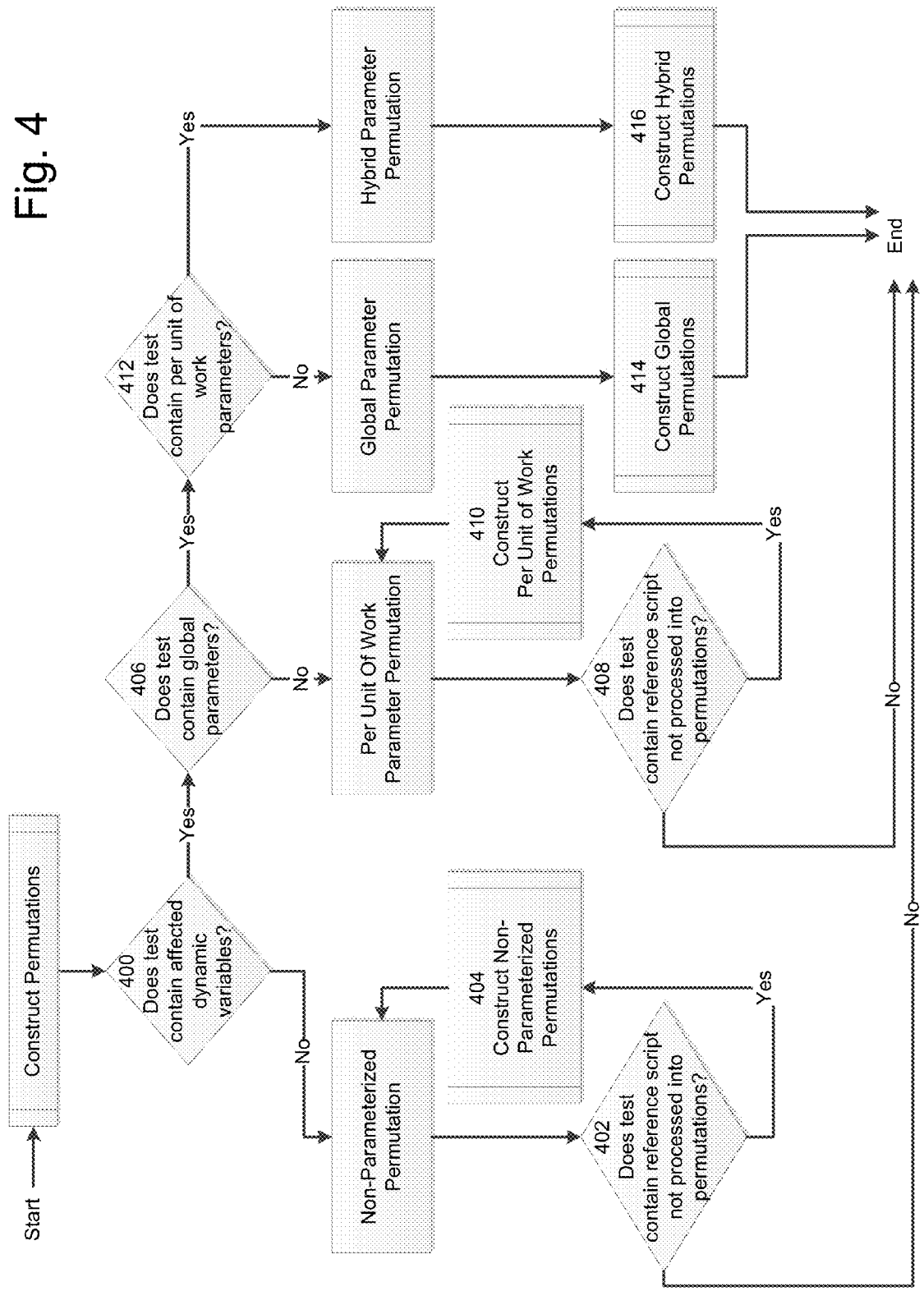
FIG. 4 is a flow chart illustrating a series of steps for the automated framework constructing permutations.

Referring to FIG. 4, the automated testing tool component 102 generates permutations based upon the software tester's selected script set and selected parameter set. The automated testing tool component 102 may, in general, use a math formula or functionally equivalent set of computing operations to determine the required permutations based upon the software tester's selections. At step 400, the automated testing tool component 102 may determine whether the test, based upon the selected script set, contains any dynamic variables affected by a selected parameter in the selected parameter set. If, for example, it is determined that the selected script set does not contain any such dynamic variables, then a Non-Parameterized Permutation process may be followed. When generating non-parameterized permutations, the automated testing tool component 102 may generate permutations using a simple summation such as Equation No. 1:

$$\sum_{k=1}^{t}(1) \qquad \text{(Eq. No. 1)}$$

t = # of reference scripts selected.

At step 402, the automated testing tool component 102 simply checks to see if the test contains a reference script from the selected script set which has not been processed. If so, at step 404 the automated testing tool component 102 processes the reference script to construct a single permutation. If not, then all permutations and permutation test scripts have been created, completing the summation operation.

Figure 5:
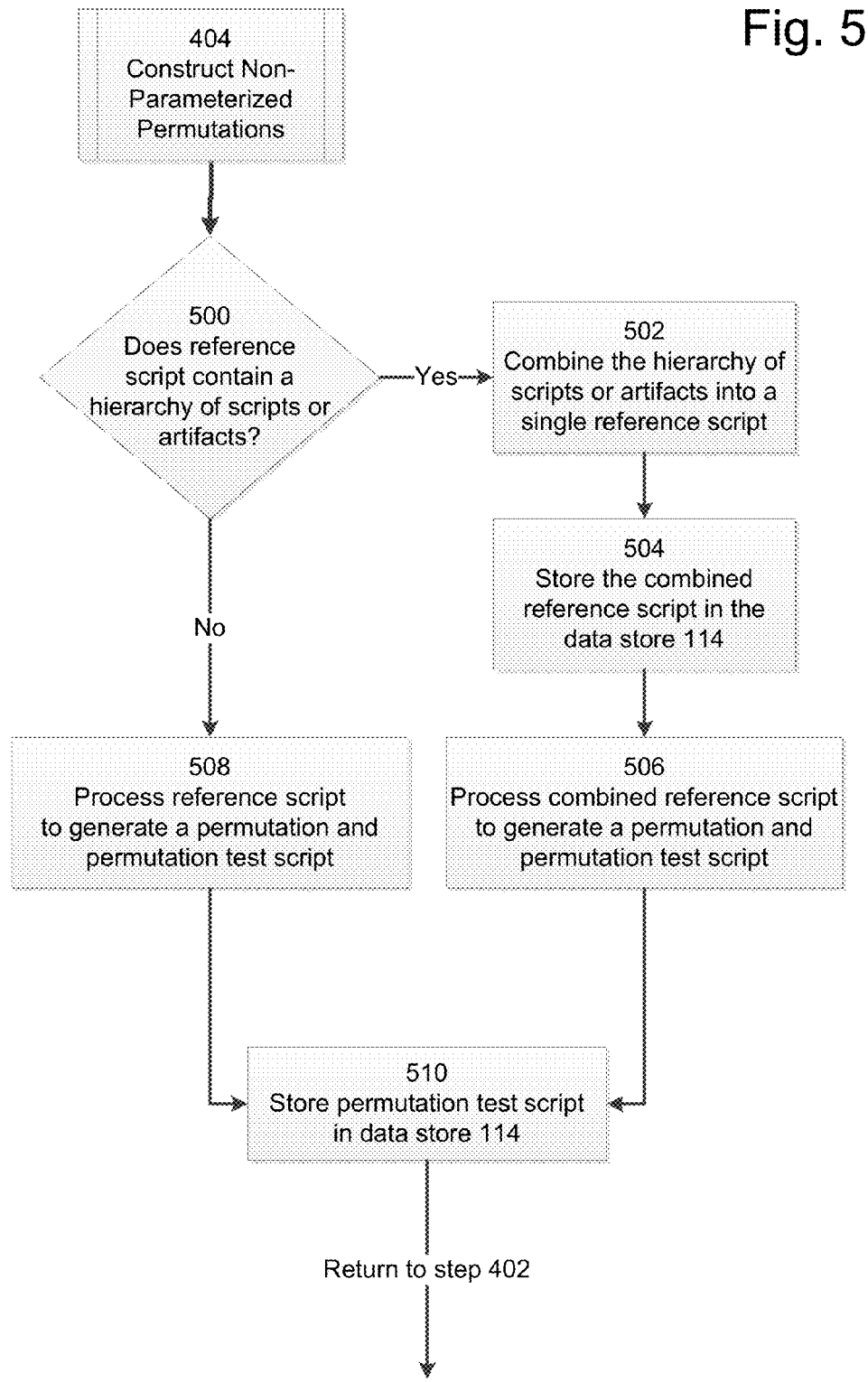
FIG. 5 is a flow chart illustrating a series of steps for the automated framework constructing non-parameterized permutations.

Referring to FIG. 5, at step 500, the automated testing tool component 102 may preprocess the selected reference script to determine if the reference script contains a hierarchy of test scripts or artifacts. A hierarchy of test scripts may exist, for example, if a reference script unconditionally references another reference script or a file containing lines of script through an "include" statement or similar directive. If so, at step 502, the automated testing tool component 102 may combine the hierarchy into a single reference script to process. At step 504, the combined reference script may be stored in the data store 114. At step 506, a single instance of the combined reference script may be processed to generate a permutation test script using only default dynamic variable value(s) and value type(s), as discussed more generally below. If the reference script does not contain a hierarchy of test scripts, then at step 508 a single instance of the selected reference test script may be processed to generate a permutation test script using only default dynamic variable value(s) and value type(s), as discussed more generally below. At step 510, the generated permutation test script may be stored in the data store 114 for execution by the automated test tool component 102 at a later time (e.g., serial permutation test script execution), for execution by a test tool on a separate testbed computer (e.g., parallel permutation test script execution), and/or for test auditing purposes. The process then loops back to step 402 to determine if additional reference scripts from the selected script set have yet to be processed into permutations and permutation test scripts.

Referring back to FIG. 4, if at step 400 it is determined that the test, based upon the selected script set, does contain dynamic variables affected by a selected parameter in the selected parameter set, then parameterized permutations are generated. In the subsequent discussion, it is assumed for sake of simplicity that each reference script in the selected script set contains at least one such dynamic variable. However, the reader will recognize that combinations of non-parameterized and parameterized permutations may be generated by generalizing the following discussion in view of the preceding example.

At step 406, the automated testing tool component 102 may determine if the selected script set contains any "global parameters." A global parameter is a parameter which affects at least one dynamic variable in each reference script within the selected script set. If there are no global parameters, then each selected parameter may be treated as a "per unit of work parameter," and a Per Unit of Work Parameter Permutation process may be followed. A per unit of work parameter is a parameter used to create tuples mapped to a Cartesian product that is mapped to a single reference script in order to determine permutations to generate from the reference script. The software tester selects these per unit of work parameters at step 302, as discussed above, although the software tester need not necessarily be informed whether a selected parameter is to serve as a per unit of work parameter. For sake of consistency and ease of use, a per unit of work parameter affecting dynamic variables in more than one reference script might be selected only once in step 302, but otherwise be processed as if separate per unit of work parameters had been selected for each selected reference script. When generating per-unit-of-work-parameterized permutations, the automated testing tool component 102 may use a summation of n-ary Cartesian product multiplication operations for each selected reference script, such as that in Equation No. 2:

$$\sum_{k=1}^{t}\left(X_{1}x\ldots xX_{n}=\{(x_{1},\ldots,x_{n}):x_{i}\in X_{i}\}\right) \qquad \text{(Eq. No. 2)}$$

$x_k$ = # of per unit of work parameters (Grouped Override types and external identifiers) selected by user which affect dynamic variables in test script $k$.

t = # of reference scripts selected by user.

to determine the permutations to execute and, for each permutation, a unique permutation parameter set which may be stored in the data store 114. At step 408, the automated testing tool component 102 may determine if the test contains a reference script from the selected script set which has not been processed into permutations. If all reference scripts have been processed into permutations then the process ends, completing the summation operation. If a reference script needs to be processed, then at step 410 the automated testing tool component 102 processes the reference script to construct per unit of work permutations.

Figure 6:
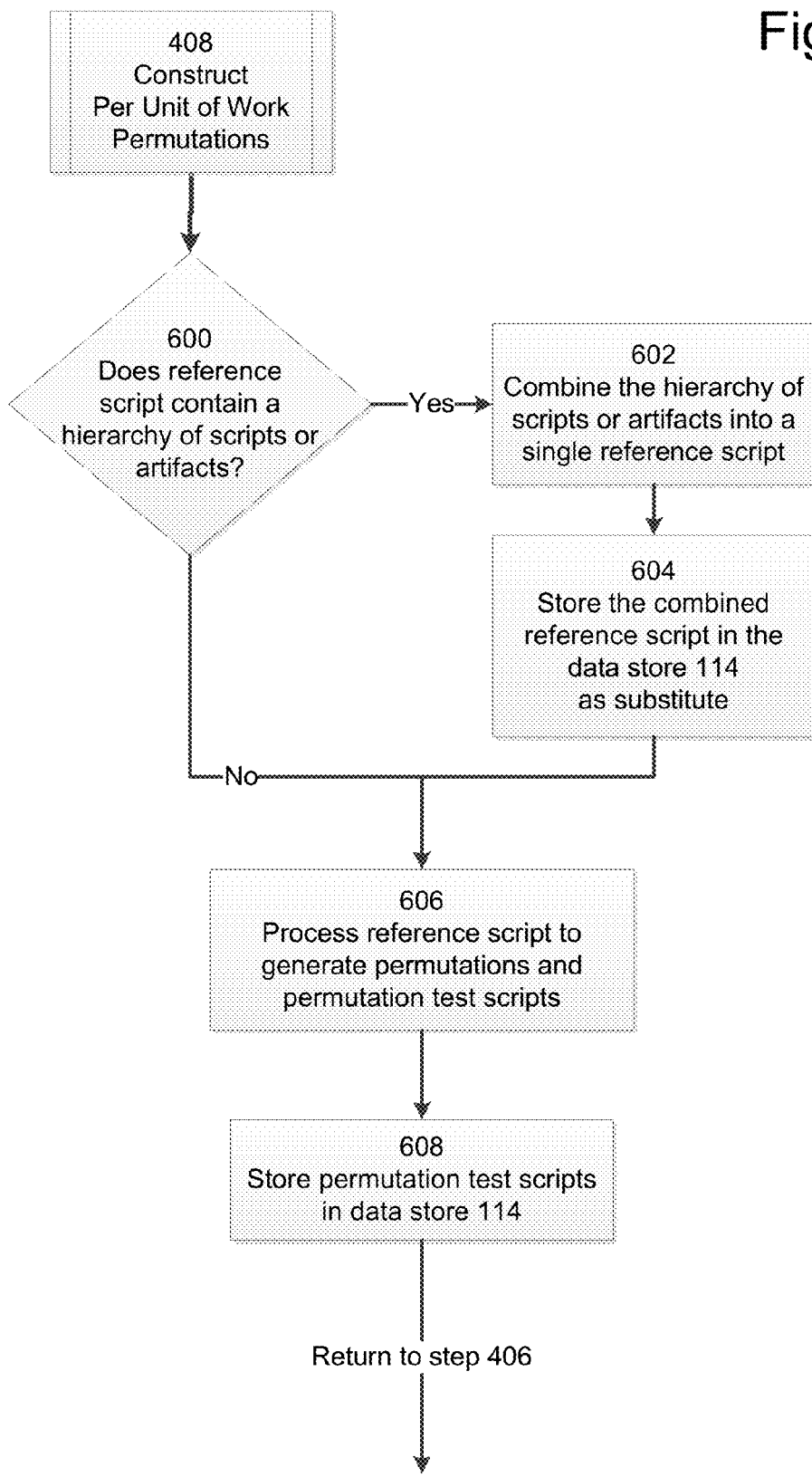
FIG. 6 is a flow chart illustrating a series of steps for the automated framework constructing per unit of work permutations.

Referring to FIG. 6, in an embodiment, at step 600 the automated testing tool component 102 may preprocess the selected reference script to determine if the reference script contains a hierarchy of scripts or artifacts. If the reference script does not contain a hierarchy of test scripts, then, at step 606, the automated testing tool component 102 may generate permutations through use of a Cartesian product that is based upon the reference script and the selected parameter set (specifically, the selected per unit of work parameters affecting the dynamic variables in that reference script). Referring back to step 600, if the reference script contains a hierarchy of scripts or artifacts, then at step 602 the automated testing tool component 102 combines the hierarchy into a single combined reference script, and at step 604 the combined reference script is stored in the data store 114 as a substitute for the uncombined reference script stored in the script repository 112. This substituted reference script may then be processed using the same per unit of work parameter process discussed above at step 606. At step 606, the unique permutation parameter set generated for each permutation is also used to generate a permutation test script for each permutation, as further described below. The reader will appreciate that although the test creation component 108 may generate the permutation test scripts from the unique permutation parameter set in some embodiments, in other embodiments another instance of the test creation component 108 or even a distinct software agent may generate the permutation test scripts from the unique permutation parameter set stored in the data store 114. At step 608, the generated permutation test scripts may be stored in the data store 114. The process loops back to step

408 to determine if additional reference scripts from the selected script set have yet to be processed into permutations and permutation test scripts.

Referring back to FIG. 4, at step 406, if the test, based upon the selected script set, does contain global parameters, then at step 412, the automated testing tool component 102 may determine if the test also contains per unit of work parameters. If there are no per unit of work parameters, then each selected parameter may be treated as a global parameter and a Global Parameter Permutation process may be followed. When generating globally-parameterized permutations, the automated testing tool component 102 may use an n-ary Cartesian product multiplication operation for the selected script set, such as that in Equation No. 3:

$$(X_1 x \ldots x X_n = \{(x_1, \ldots, x_n) : x_i \in X_i\}) * t \quad \text{(Eq. No. 3)}$$

x=# of global parameters (Grouped Override types and external identifiers) selected by user t=# of reference scripts selected by user.

to determine the permutations to execute and, for each permutation, a unique permutation parameter set which may be stored in the data store 114.

Figure 7:
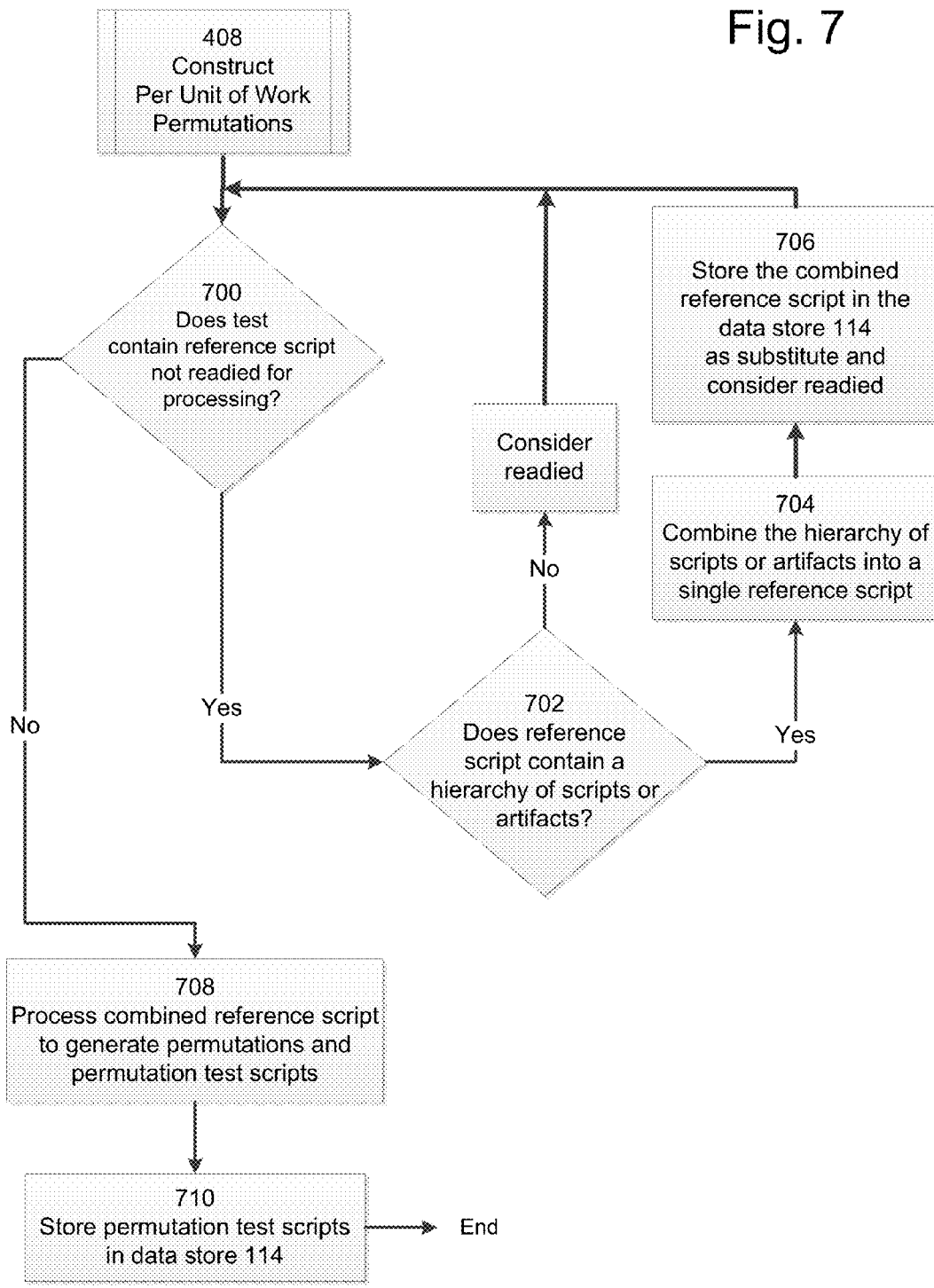
FIG. 7 is a flow chart illustrating a series of steps for the automated framework constructing global permutations.

Referring to FIG. 7, in an embodiment, at step 700 the automated testing tool component 102 may preprocess each selected reference script to determine if the test contains a reference script that has not been readied for processing into permutations. If all reference scripts have been readied, then at step 708 the n-ary Cartesian product multiplication operation is executed and the unique permutation parameter set generated for each permutation is used to generate a permutation test script for each permutation, as further described below. At step 710, the generated permutation test scripts may be stored in the data store 114. If a reference script needs to be processed, then at step 702 the automated testing tool component 102 determines if the reference script contains a hierarchy of scripts or artifacts. If the reference script does not contain a hierarchy of test scripts, then the reference script is considered readied. If the reference script contains a hierarchy of test scripts or artifacts, then at step 704 the automated testing tool component 102 combines the hierarchy into a single combined reference script. At step 706 the combined reference script is then stored in the data store 114 as a substitute for the reference script stored in the script repository 112 and considered readied. These substituted reference scripts may then be processed as part of the selected script set in place of the uncombined reference scripts in the global parameter process discussed above.

Referring back to FIG. 4 and step 412, if the test contains per unit of work parameters in addition to global parameters, then each selected parameter may be classified as either a global parameter or a per unit of work parameter, and a Hybrid Parameter Permutation process may be followed. When generating hybrid-parameterized permutations, the automated testing tool component 102 may use a complex summation utilizing an n-ary Cartesian product of the global parameters and the selected script set as the summation operator, along with a sub summation of n-ary Cartesian product multiplication operations of the per unit of work parameters and each reference script in the selected script set. In other words, hybrid parameter permutations take the global parameters to create tuples mapped to the Cartesian product that is then multiplied by the total number of permutations from the per unit of work parameters that are tuples mapped to the sub-Cartesian product that is mapped to a reference script, using a complex operation, such as that in Equation No. 4:

$$\sum_{k=1}^{(Y1y \ldots yYn = \{(y1, \ldots, yn) : yi \in Yi\})} \left( \sum_{k_2=1}^{t2} (X_1 x \ldots x X_n = \{(x_1, \ldots, x_n) : x_i \in X_i\}) \right) \quad \text{(Eq. No. 4)}$$

x = # of per unit of work parameters (Grouped Override types and external identifiers) selected by user which affect dynamic variables in test script $k_2$.

t2 = # of reference scripts selected by user.

y = # of global parameters (Grouped Override types and external identifiers) selected by user.

to determine the permutations to execute and, for each permutation, a unique permutation parameter set which may be stored in the data store 114. The software tester selects both global and per unit of work parameters for the test scripts at step 302, as discussed above, without necessarily knowing that the selected parameters in the selected parameter set are of either (or any) particular type. The automated testing tool component 102 may preprocess each selected reference script in a manner that is substantially similar to that shown in FIG. 6, with the scripts being considered readied for processing in the global parameter-related summation operation after having been preprocessed for the per unit of work parameter-related sub summation operation.

Figure 8A:
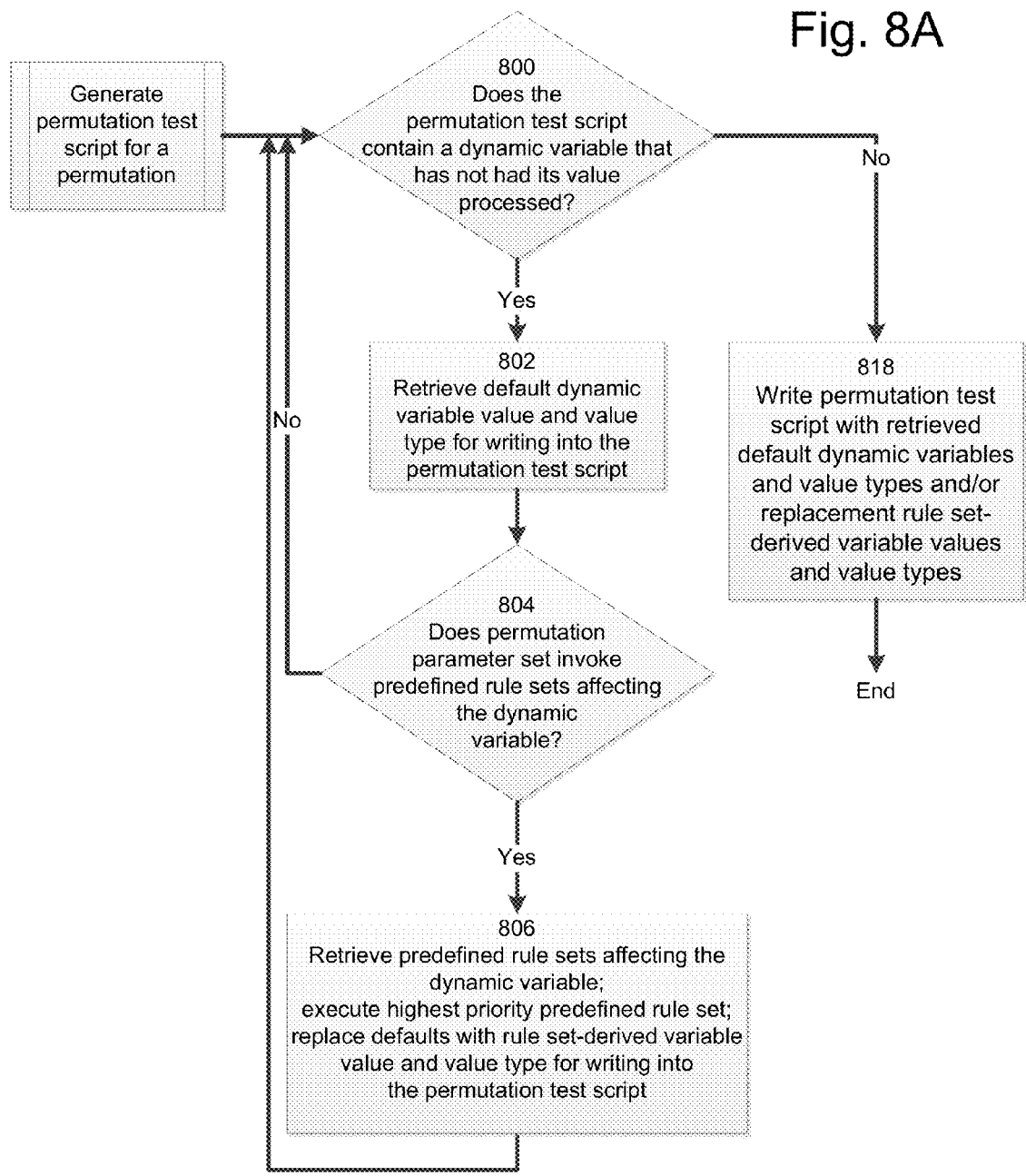
FIG. 8A is a flow chart illustrating in detail the steps carried out in generating a permutation test script.
Figure 8B:
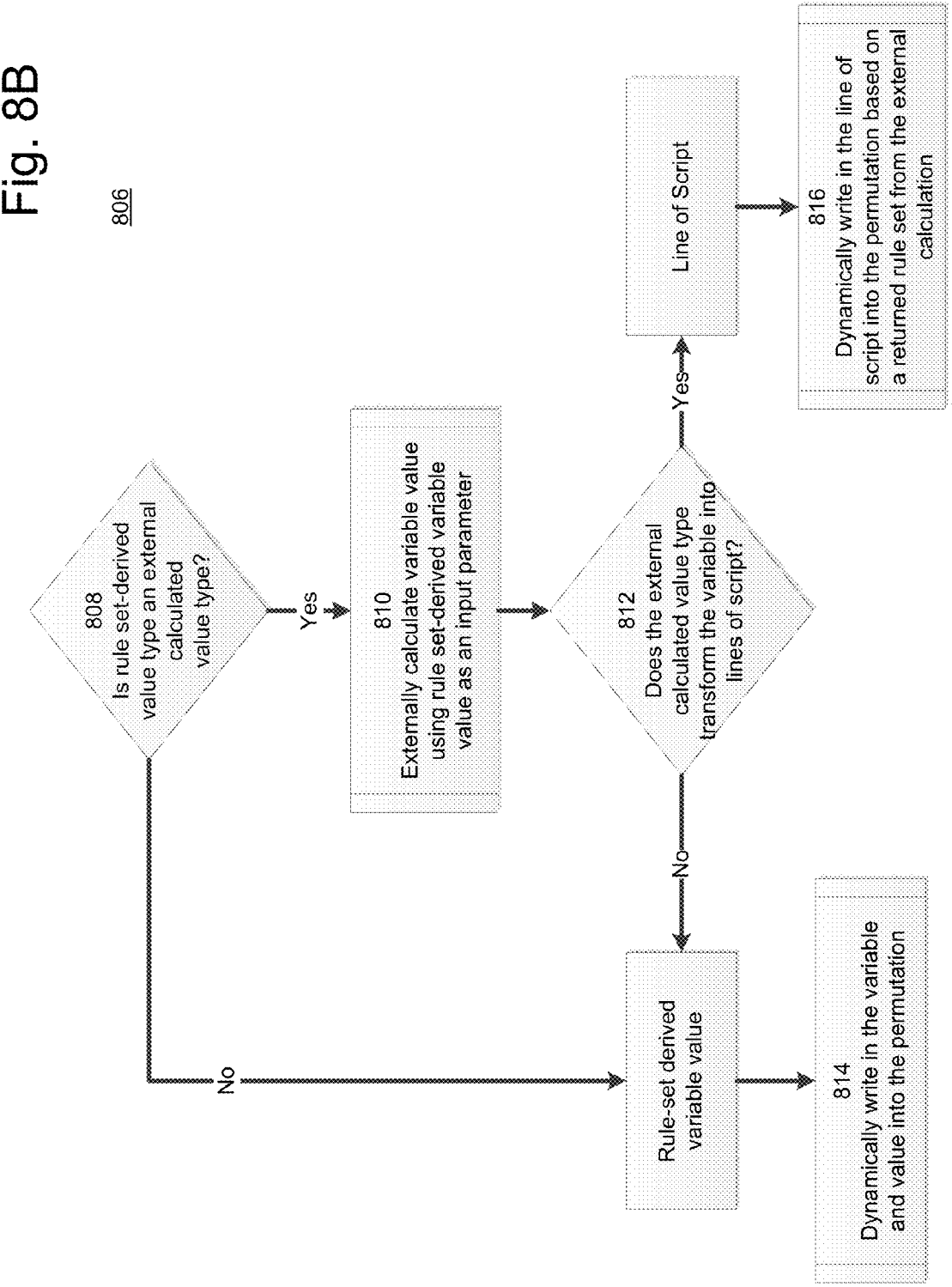
FIG. 8B is a flow chart illustrating in detail the substeps carried out in step 806 of FIG. 8A.

Referring to FIGS. 8A and 8B, in one embodiment, after generating the permutations, the automated testing tool component 102 generates permutation test scripts instanced from the selected test script set for each permutation, deriving the varying dynamic variables and variable values to be included in the permutation test scripts based upon the selected script set and the selected parameter set as described below. In another embodiment, after generating one or more permutations, but prior to generating all such permutations, the automated testing tool component 102 begins to generate permutation test scripts instanced from the selected test script set, deriving the dynamic variable names and variable values to be included in permutation test scripts generated during essentially simultaneous processing of the selected script set and selected parameter set. At step 800, the automated testing tool component 102 checks to see if a permutation test script instance contains a dynamic variable which has not had its variable value processed. If not, then the dynamic variable value assignment process ends for that permutation test script instance. If that permutation test script instance does contain a dynamic variable that needs processing, then the variable value assignment process continues. At step 802, the automated testing tool component 102 retrieves the default dynamic variable value and value type from the data store 114 for writing into the permutation test script instance. At step 804, the automated testing tool component 102 determines if one or more predefined rule sets affecting the dynamic variable have been invoked by the unique permutation parameter set for that permutation. If there is no predefined rule set which affects the dynamic variable, then the variable value assignment process loops back to step 800. If there is, then the variable value assignment process continues to step 806. At step 806, the automated testing tool component 102 retrieves the predefined rule sets affecting the dynamic variable, executes the highest priority retrieved predefined rule set, and replaces the default dynamic variable value and value type retrieved for writing with the rule set-derived variable value and value type. More specifically, at substep 808, the automated testing tool component 102 may determine if the rule set-derived value type is an external calculated value type. If it is determined that the rule-set derived value type is not an external calculated value type, then the variable value assignment process may continue to substep 814, as discussed below. If the rule set-derived value type is an external calculated value type, then at substep 810 a variable value may be externally calculated using the rule-set specified variable value as an input parameter, and using the output or a returned parameter as the rule-set derived variable value. At substep 812, the automated testing tool component 102 determines if the external calculated value type transforms the dynamic variable into a line of script. If not a line of script, then at substep 814 the retrieved default dynamic variable value is replaced with the rule set-derived variable value. If transformed into a line of script, then at step 816 the retrieved default dynamic variable value is replaced with the variable value, in the form of one or more lines of script, outputted or returned by the external calculation. The process then loops back to step 800. Once the permutation test script instance contains no dynamic variables which have not had their variable value processed, at step 818 a permutation test script is written with the retrieved default dynamic variable values and value types and/or replacement rule set-derived variable values and value types as described above to the data store 114. The reader will appreciate that a permutation test script instance and resultant permutation test script will be generated for each selected reference script in the selected script set, so that if there is only one selected reference script in the selected script set, there will be one permutation test script per permutation, but if there are, e.g., three selected reference scripts in the selected script set, there will be three permutation test scripts per permutation, with three permutation test script instances being processed in accordance with steps 800-816.

Referring back to step 804, in an embodiment, a relational algebra operation may be used to determine which dynamic variables are affected by the unique permutation parameter set for the permutation. If a dynamic variable is to be used in permutations of a reference script, then a predefined rule set will have been created mapping one or more parameters to the dynamic variable. At run time, these selectable parameters create tuples which may be used as a divisor table, and the user's actual selection of parameters for the test, i.e., the software tester's selected parameter set, create tuples which may be used as a quotient table, whereupon the two tables may be cross joined to produce a dividend table. The dividend table will contain the dynamic variables and the selected parameters (if any) which affect them. If the dynamic variable is not part of the dividend table, then no selected parameter invokes a predefined rule set which will alter the default dynamic variable value and value type, and generation of the permutation test script may proceed to processing of the next dynamic variable (if any). If the dynamic variable is part of the dividend table, then the variable value assignment process may continue at step 806. Similarly, the dividend table may be used to distinguish between non-parameterized permutations, per unit of work-parameterized permutations, globally-parameterized permutations, and hybrid-parameterized permutations. In implementations, a database query may be used with a data model such as the one depicted in FIGS. 15A-D in order to retrieve the dynamic variables and parameters involved. An exemplary structured query language (SQL) query, such as:

```
select v.value
from dbo.Value v
where v.Id = (select dvv.ValueId
    from dbo.DynamicVariableValue dvv
    where dvv.DynamicVariableId = @DynamicVariableId and
        dvv.DynamicVariableGroupId = (select top 1
        dvp.DynamicVariableGroupId
    from dbo.DynamicVariablePriority dvp
    where dvp.DynamicVariableId = @DynamicVariableId and
        dvp.DynamicVariableGroupId in
        (select dvgs.DynamicVariableGroupId
    from dbo.DynamicVariableGroupSource dvgs
    where dvgs.DynamicVariableGroupId not in (select
        dvgs2.DynamicVariableGroupId
    from dbo.DynamicVariableGroupSource dvgs2
    where dvgs2.DynamicVariableSourceId in (select dvs.Id
    from dbo.DynamicVariableSource dvs
    where dvs.Id not in (select dvi.DynamicVariableSourceId
    from dbo.DynamicVariableInstance dvi
    where dvi.ExecutionInstanceId = @ExecutionInstanceId)
    )
    group by dvgs2.DynamicVariableGroupId)
    group by dvgs.DynamicVariableGroupId)
    order by dvp.Priority)
)
``` may be used in a particular implementation using the depicted data model.

Finally, it will be noted that the dynamic variables in the framework may be of varying external calculated value types, e.g., a database query, a code object, a "reference to lines of script," a "directive to replace with script," a test, etc. In other words, an external calculated value type may describe where a value will be derived from. For example, a value type of database query would mean that a database script, with a connection string, would be executed and the returned result would be the value to use for the dynamic variable. Additionally, a value type of code object would mean that a code object such as C or C++ (with compilation), Javascript or Python (with interpretation), binary large object (precompiled), or other code known to a person skilled in the art would be executed and the returned result would be the value to use for the dynamic variable. A value type of "reference to lines of script" would mean that a predefined rule set could be defined which stated that the dynamic variable is to be replaced with one or more lines of script, instead of actually defining the dynamic variable and deriving and setting its value prior to run time. A value type of "directive to replace with script" would mean that one or more lines of script, in accordance with additional metadata about the lines of script (such as where to insert within the permutation test script instance), is to be inserted in place of or in addition to lines of script at a script location other than that of the dynamic variable, with the dynamic variable being otherwise not used and/or removed within the permutation test script instance. The "directive to replace with script" may be used to change the instruction sequence of the permutation test script, e.g., permit the reference script to be generalized to test an interactive website having similar but differently implemented data input features for different languages, without requiring explicit modification of the reference test script to include nested conditional structures or multiple case selection structures in order to switch between alternate execution flows. The reader will appreciate that such metadata may describe one or more locations for code replacement, inclusion, and/or deletion (replacement w/o executable instructions).

Figure 10:
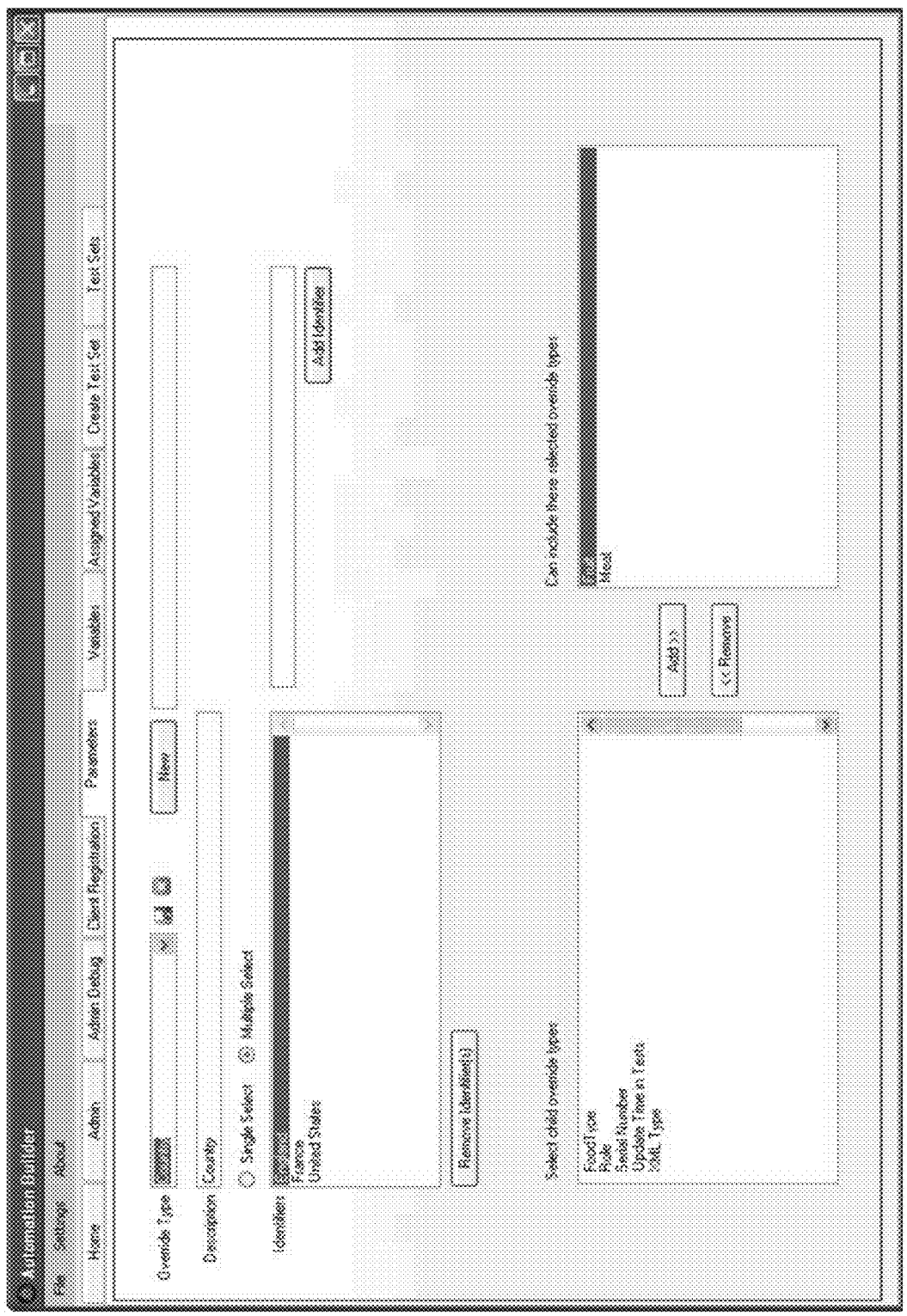
FIG. 10 is an exemplary screen shot of a testing tool used to define the dynamic variables and parameters used by the automated framework.
Figure 11:
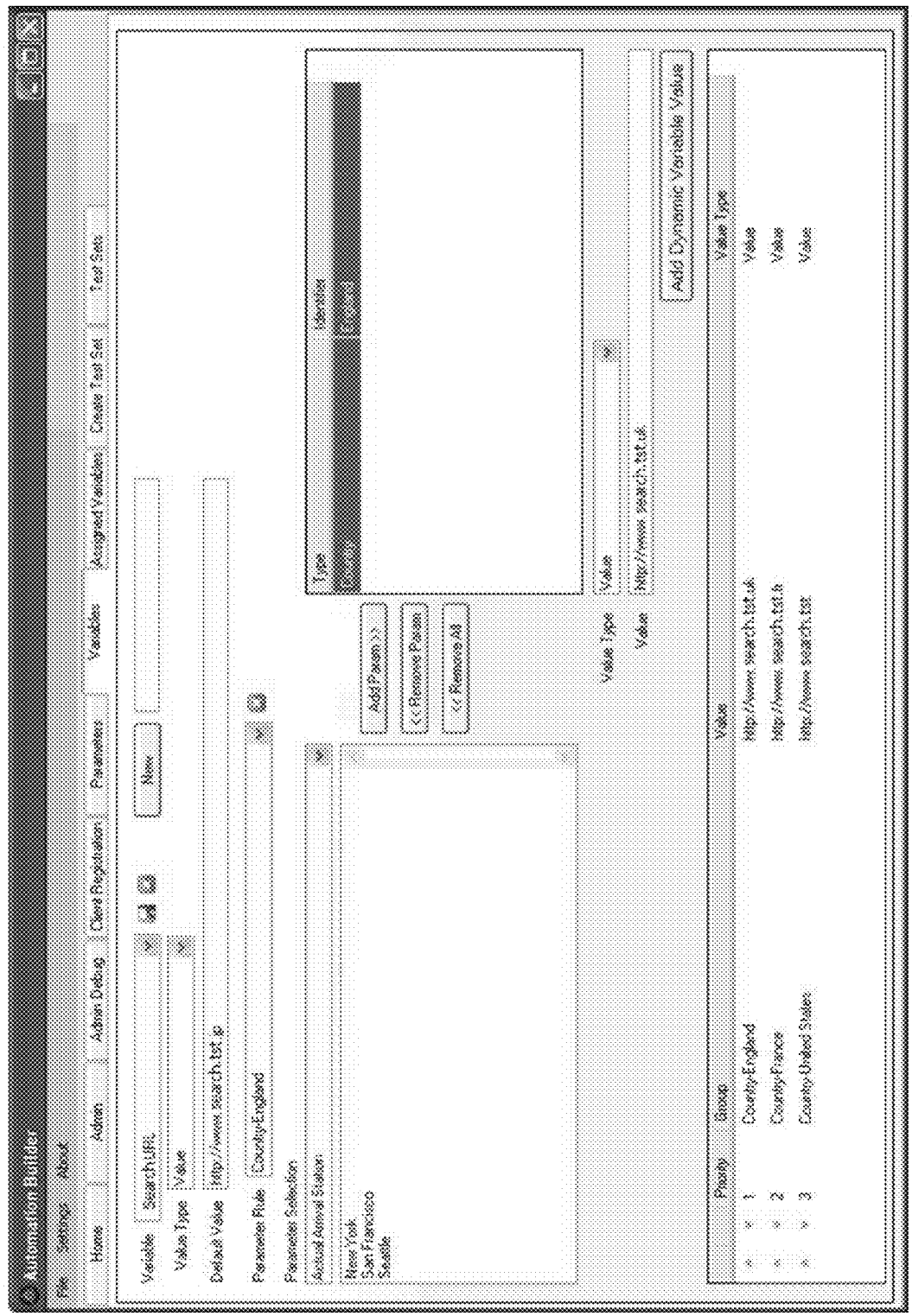
FIG. 11 is another exemplary screen shot of the testing tool of FIG. 10.
Figure 12:
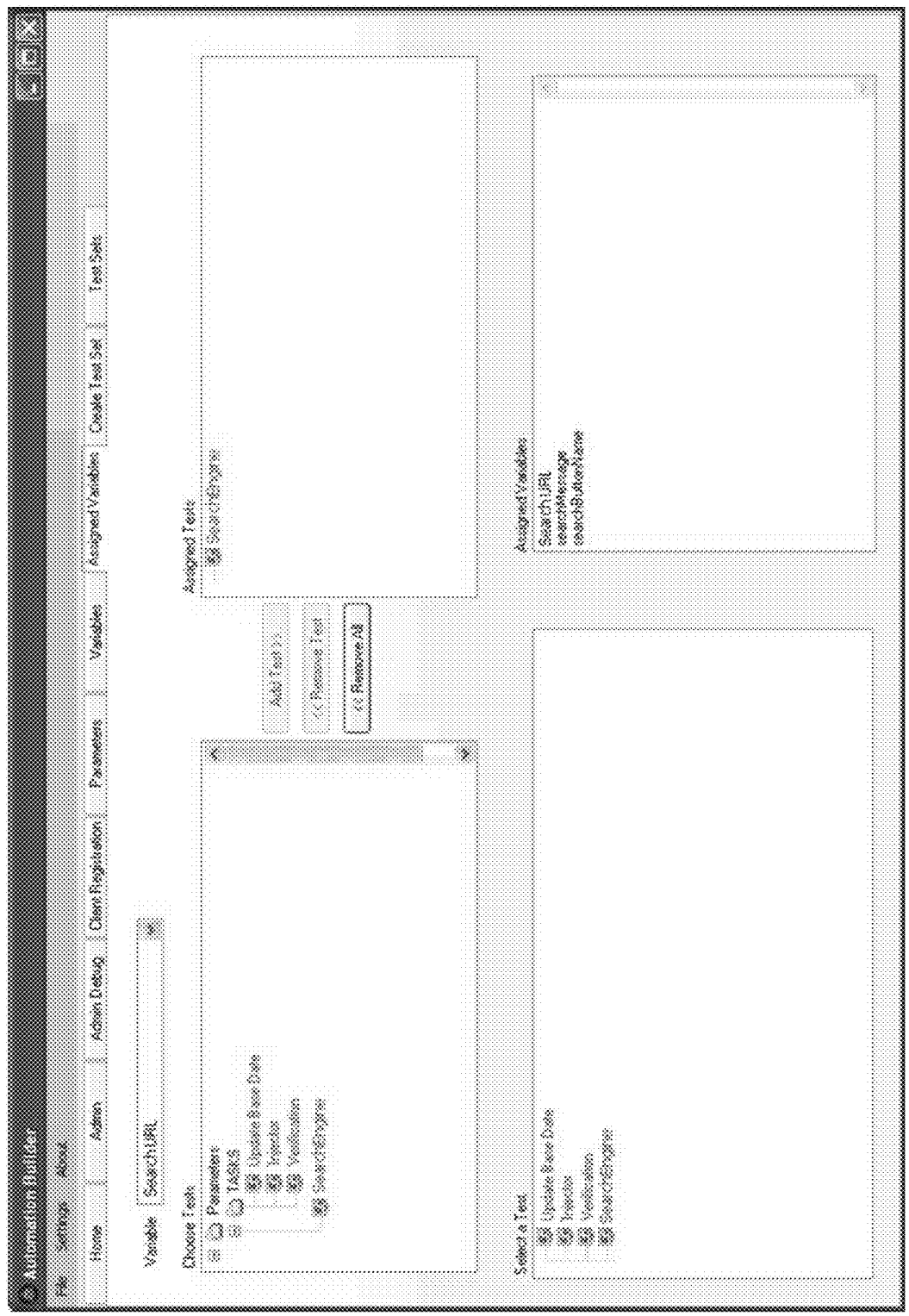
FIG. 12 is yet another exemplary screen shot of the testing tool of FIGS. 10 and 11.
Figure 13:
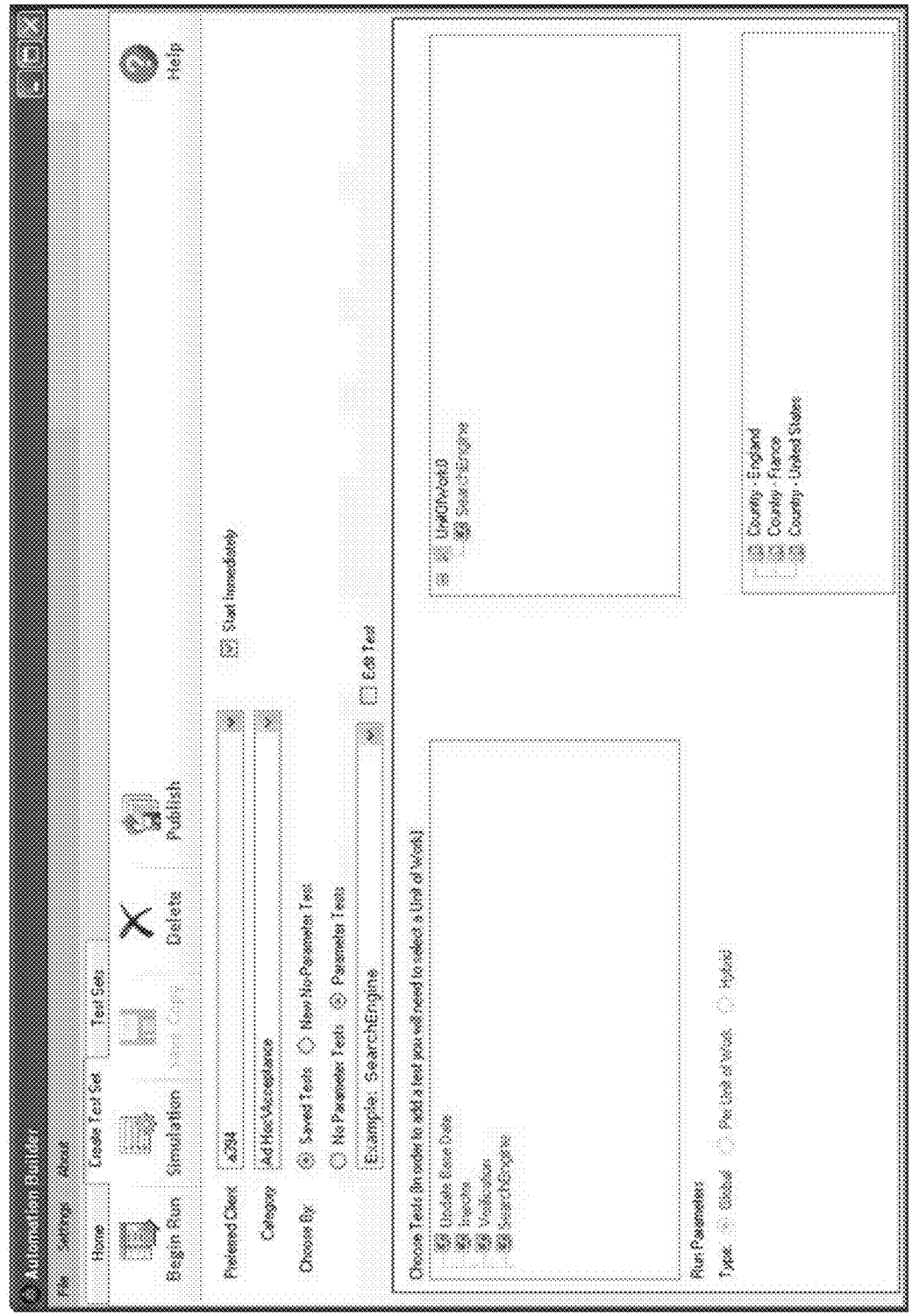
FIG. 13 is an exemplary screen shot of a testing tool used to select the reference scripts and parameters for a test.
Figure 14:
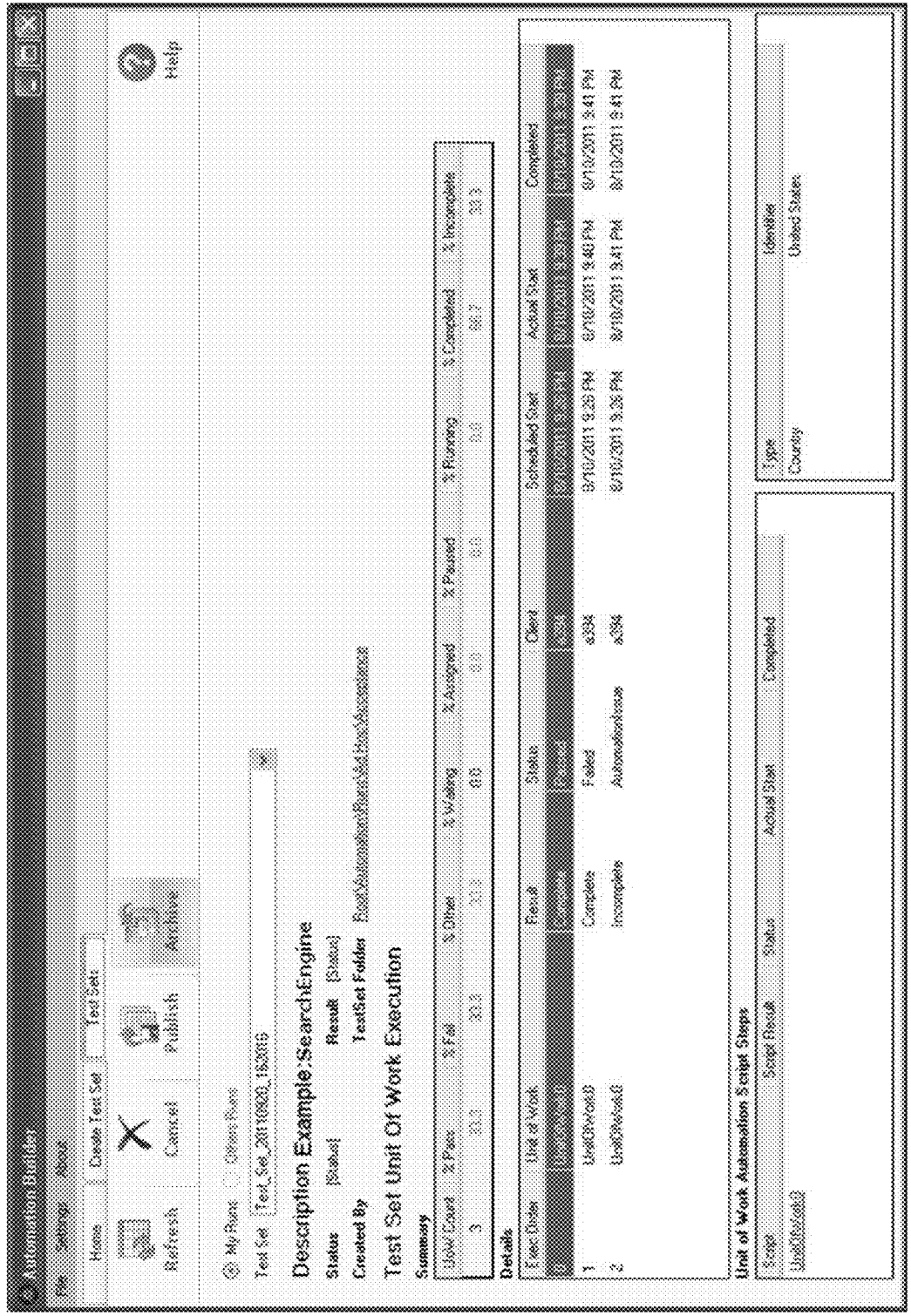
FIG. 14 is an exemplary screen shot displaying an aggregated result set to a user.
Figure 15:
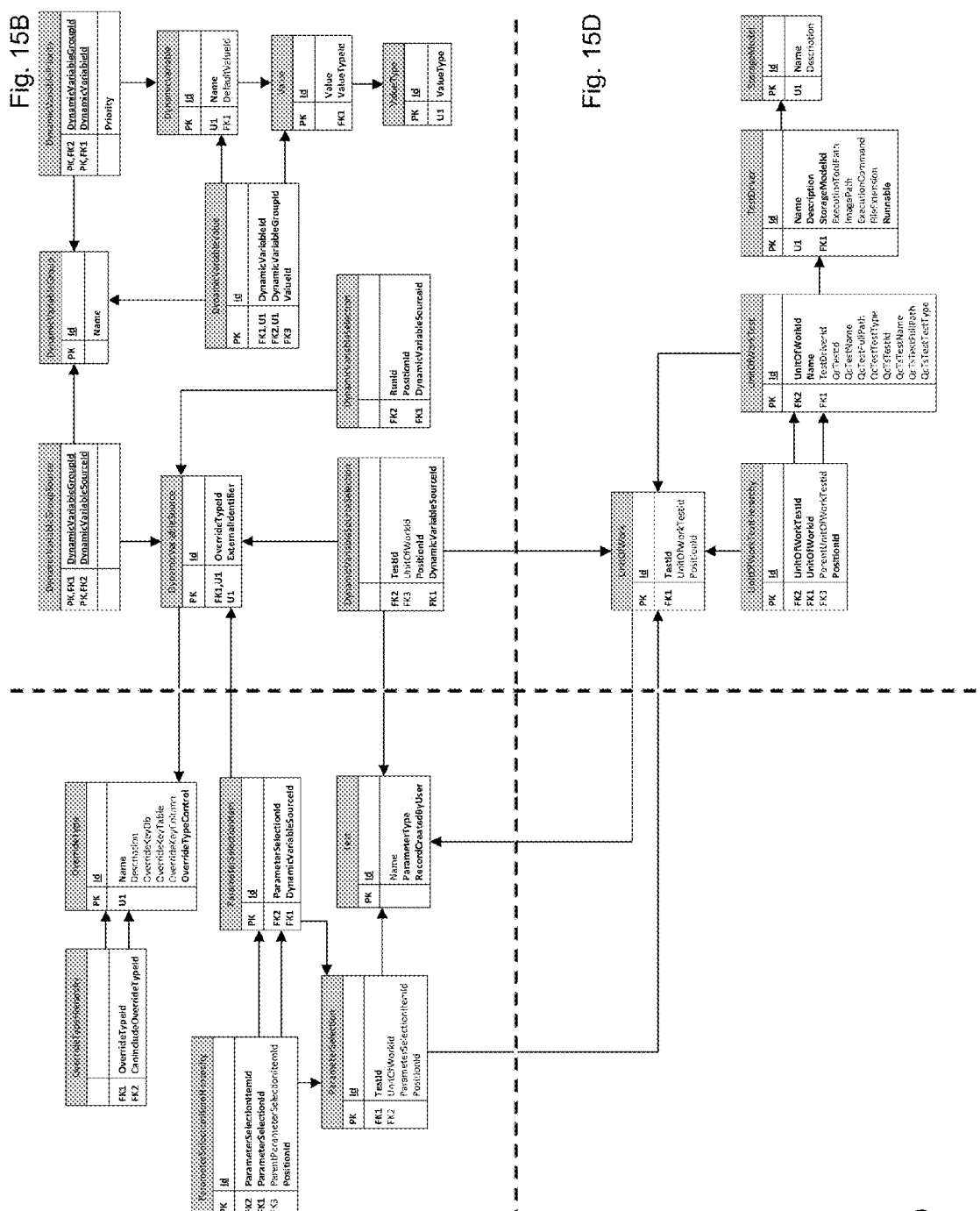
FIGS. 15 and 15A-D are an illustration of an exemplary data model for parameterization storage in the data store.
Figure 15A:
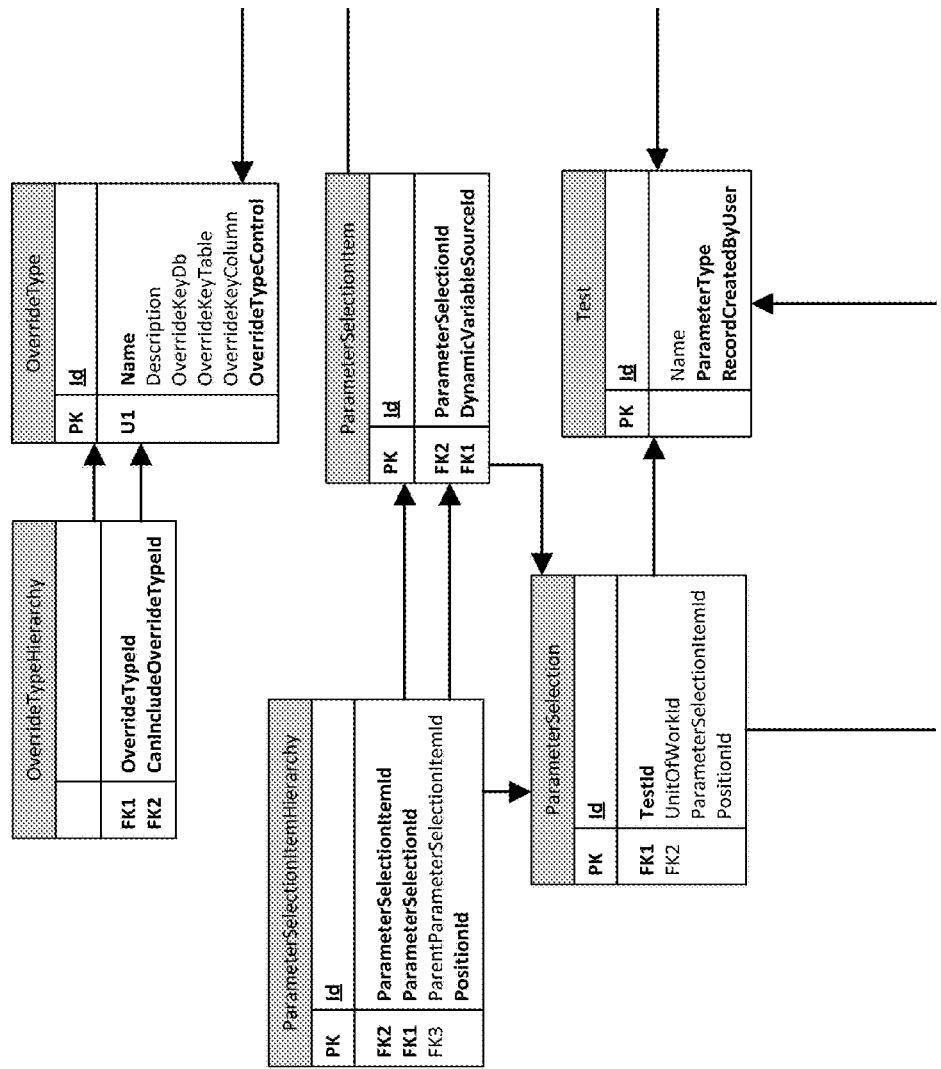
Figure 15B:
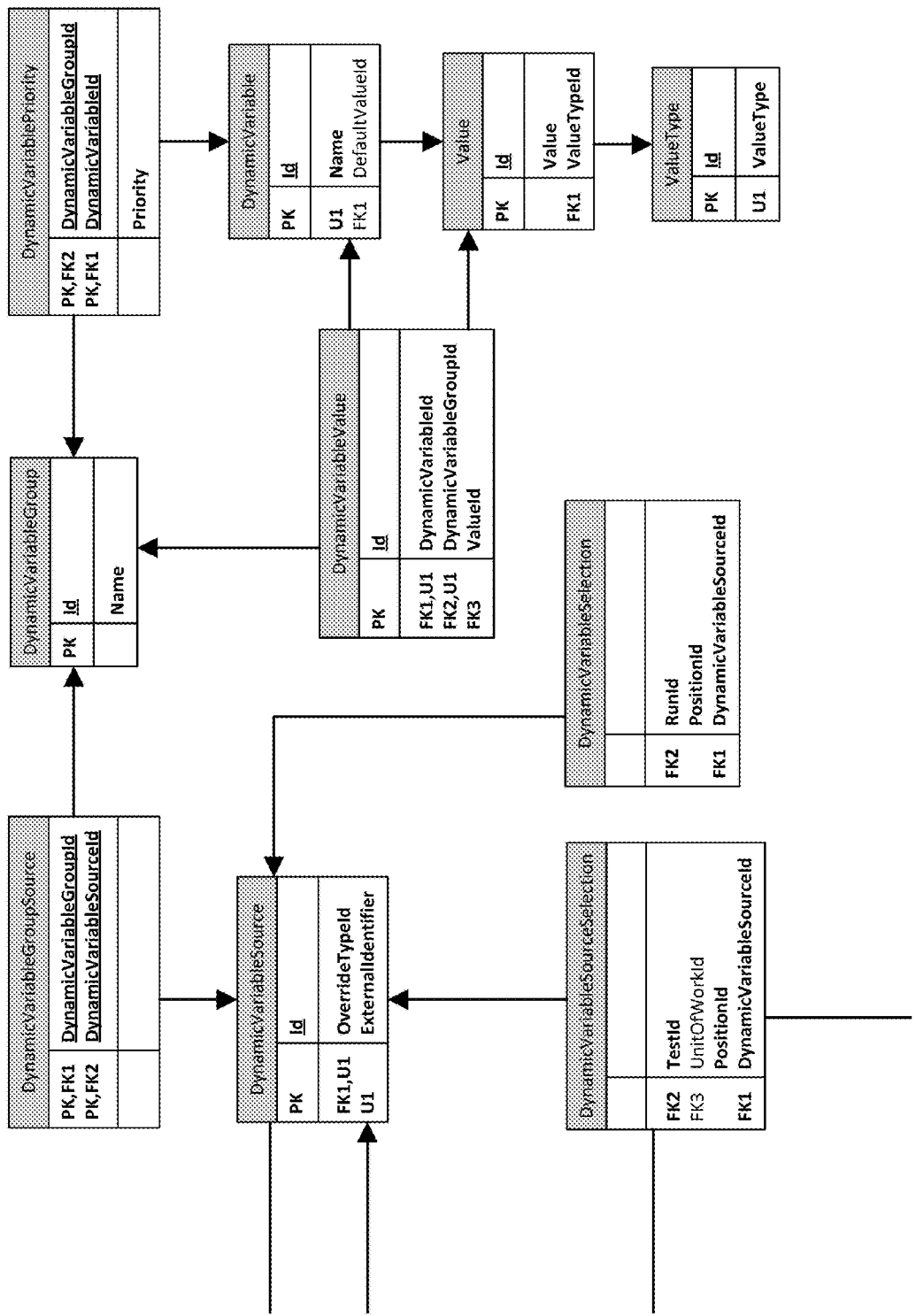
Figure 15C:
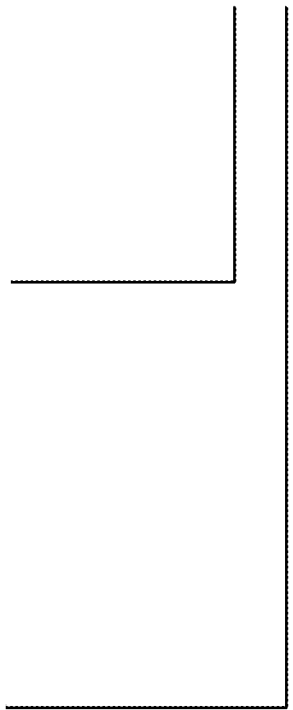
Figure 15D:
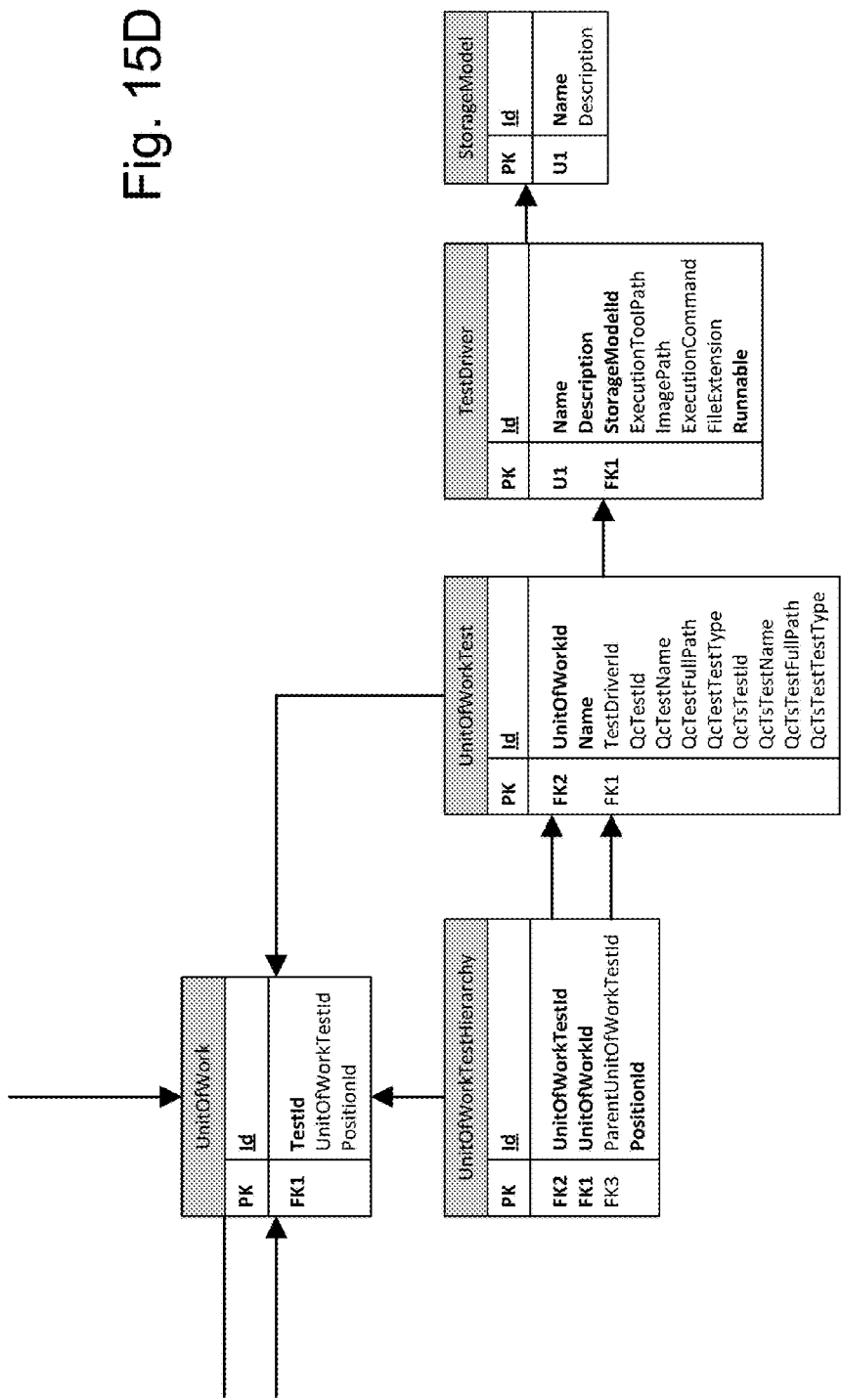

An exemplary implementation, from the perspective of a software tester, is shown in FIGS. 9A-15D. FIG. 9A depicts an exemplary reference script including an exemplary dynamic variable 902 having an internal value type and an exemplary dynamic variable 904 having an external calculated value type of "directive to replace with script." FIG. 9B depicts an exemplary permutation test script generated from the exemplary reference script including the dynamic variable 902 and a variable value and value type 906, as well as lines of script 908 inserted at a location other than that of exemplary dynamic variable 904, with the associated dynamic variable 904 having been removed from the permutation test script. FIGS. 10-12 depict examples of screens that the software tester may use in the above step 202 to define the dynamic variables needed for the test, and to define which dynamic variables need to have data generated at run time. FIG. 13 depicts an example of a screen that another software tester may use in the above steps 300 and 302 to select the reference scripts and parameters to run and use in a test. FIG. 14 depicts an example screen displaying the aggregated result set to the software tester in the above step 310. FIGS. 15 and 15A-D depict an exemplary data model for the data store 114, which may store the parameters (and the tuples and dynamic variables associated with the parameters) as well as the pre-defined rule sets defined by a skilled software tester for potential use by other, non-skilled software testers in dynamically creating testing scripts.

The embodiments of the invention shown in the drawings and described above are exemplary of numerous embodiments that may be made within the scope of the appended claims. It is contemplated that numerous other configurations of an automated framework for dynamically creating test scripts for software testing may be created taking advantage of the disclosed approach. It is the applicant's intention that the scope of the patent issuing herefrom will be limited only by the scope of the appended claims.

What is claimed is:

1. A computer program product, comprising a non-transitory storage medium having a computer readable program code embodied therein, said computer readable program code being adapted to execute a method for dynamically creating test scripts for software testing, said method comprising:
    selecting one or more reference scripts to create a selected script set;
    selecting one or more parameters for use with said selected script set to create a selected parameter set;
    generating permutations of said selected script set with said selected parameter set;
    dynamically generating permutation test scripts for each of the generated permutations, wherein a plurality of the generated permutation test scripts include test code, a dynamic variable, and variable values for the dynamic variable amongst the plurality of the generated permutation test scripts; and executing at least one of the plurality of generated permutation test scripts.

2. The computer program product of claim 1 further comprising:
    aggregating results of the executed permutation test scripts to create an aggregated result set; and
    displaying said aggregated result set to a user.

3. The computer program product of claim 1, wherein the selected parameter set includes at least one per unit of work parameter, and the generation of permutations uses an n-ary Cartesian product based upon the number of per unit of work parameters affecting each selected reference script to determine the permutations for the plurality of generated permutation test scripts.

4. The computer program product of claim 1, wherein the selected parameter set includes at least one global parameter, and the generation of permutations uses an n-ary Cartesian product based upon the number of global parameters affecting the selected script set multiplied by the number of reference scripts to determine the permutations for the plurality of generated permutation test scripts.

5. The computer program product of claim 1, wherein the selected parameter set includes at least one global parameter and at least one per unit of work parameter, and the generation of permutations uses a first n-ary Cartesian product functioning as a summation operator over a sub summation operation using a second n-ary Cartesian product to determine the permutations for the plurality of generated permutation test scripts, with the first n-ary Cartesian product being based upon the number of global parameters affecting the selected script set and the second n-ary Cartesian product being based upon the number of per unit of work parameters affecting each selected reference script.

6. The computer program product of claim 1, wherein generating the permutation test scripts, test code, and variable value for each of said permutations further comprises using a relational algebra operation for each variable assigned to the permutation to dynamically derive a value for said variable in permutations of the reference scripts.

7. The computer program product of claim 1, wherein the dynamic variable type is an external calculated variable type.

8. The computer program product of claim 1, wherein the dynamic variable type is one of a database query, a code object, or one or more lines of script for execution with the plurality of generated permutation test scripts.

9. A computer program product, comprising a non-transitory storage medium having a computer readable program code embodied therein, said computer readable program code being adapted to execute a method for dynamically creating test scripts for software testing, said method comprising:
    selecting one or more reference scripts from scripts stored in a script repository to create a selected script set;
    selecting one or more parameters for use with said selected script set to create a selected parameter set;
    using a formula to generate permutations of said selected script set with said selected parameter set, wherein said formula includes at least an n-ary Cartesian product based upon the selected script set and the selected parameter set;
    using a relational algebra operation to generate a plurality of permutation test scripts including test code, a dynamic variable, and variable values for the dynamic variable amongst the plurality of the generated permutation test scripts;
    executing at least one of said permutation test scripts;
    aggregating results of said executed permutation test scripts to create an aggregated result set; and
    displaying said aggregated result set to a user.

10. The computer program product of claim 9, wherein said relational algebra operation is represented by a structured query language (SQL) statement.

11. The computer program product of claim 9, wherein said script repository is a relational database.

12. A method for dynamically creating test scripts for software testing, said method comprising:
    selecting one or more reference scripts to create a selected script set;
    selecting one or more parameters for use with said selected script set to create a selected parameter set;
    generating permutations of said selected script set with said selected parameter set;

dynamically generating permutation test scripts for each of the generated permutations, wherein a plurality of the generated permutation test scripts include test code, a dynamic variable, and variable values for the dynamic variable amongst the plurality of the generated permutation test scripts; and executing at least one of the plurality of generated permutation test scripts.

13. The method claim 12 further comprising:

aggregating results of the executed permutation test scripts to create an aggregated result set; and displaying said aggregated result set to a user.

14. The method of claim 12, wherein the selected parameter set includes at least one per unit of work parameter, and the generation of permutations uses an n-ary Cartesian product based upon the number of per unit of work parameters affecting each selected reference script to determine the permutations for the plurality of generated permutation test scripts.

15. The method of claim 12, wherein the selected parameter set includes at least one global parameter, and the generation of permutations uses an n-ary Cartesian product based upon the number of global parameters affecting the selected script set multiplied by the number of reference scripts to determine the permutations for the plurality of generated permutation test scripts.

16. The method of claim 12, wherein the selected parameter set includes at least one global parameter and at least one per unit of work parameter, and the generation of permutations uses a first n-ary Cartesian product functioning as a summation operator over a sub summation operation using a second n-ary Cartesian product to determine the permutations for the plurality of generated permutation test scripts, with the first n-ary Cartesian product being based upon the number of global parameters affecting the selected script set and the second n-ary Cartesian product being based upon the number of per unit of work parameters affecting each selected reference script.

17. The method of claim 12, wherein generating the permutation test scripts, test code, and variable value for each of said permutations further comprises using a relational algebra operation for each variable assigned to the permutation to dynamically derive a value for said variable in permutations of the reference scripts.

18. The method of claim 12, wherein the dynamic variable type is an external calculated variable type.

19. The method of claim 12, wherein the dynamic variable type is one of a database query, a code object, or one or more lines of script for execution with the plurality of generated permutation test scripts.

* * * * *